US011273357B2

(12) United States Patent
Chowdhary et al.

(10) Patent No.: US 11,273,357 B2
(45) Date of Patent: Mar. 15, 2022

(54) INTERACTIVE EXERCISE EXPERIENCE

(71) Applicant: International Business Machines Corporation, Armonk, NY (US)

(72) Inventors: Pawan Chowdhary, San Jose, CA (US); Kumar R. Virwani, Santa Clara, CA (US); Charles Thomas Rettner, San Jose, CA (US); Bulent N. Kurdi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 16/117,045

(22) Filed: Aug. 30, 2018

(65) Prior Publication Data
US 2020/0070033 A1  Mar. 5, 2020

(51) Int. Cl.
| | |
|---|---|
| *G01C 19/00* | (2013.01) |
| *G01P 15/08* | (2006.01) |
| *G06N 20/00* | (2019.01) |
| *A63B 71/06* | (2006.01) |
| *G06N 5/04* | (2006.01) |

(52) U.S. Cl.
CPC .......... *A63B 71/0619* (2013.01); *G01C 19/00* (2013.01); *G01P 15/08* (2013.01); *G06N 5/048* (2013.01); *G06N 20/00* (2019.01)

(58) Field of Classification Search
CPC .... A63B 71/0619; G06N 20/00; G06N 5/048; G06N 5/04; G06N 5/022; G01C 19/00; G01C 21/16; G01P 15/08
See application file for complete search history.

(56) References Cited

U.S. PATENT DOCUMENTS

| | | | |
|---|---|---|---|
| 8,593,286 B2 | 11/2013 | Razoumov et al. | |
| 8,944,939 B2 * | 2/2015 | Clark | A63B 71/0619 473/453 |

(Continued)

FOREIGN PATENT DOCUMENTS

GB      2519987      5/2015

OTHER PUBLICATIONS

Lin, Jonathan Feng-Shun, Automated Rehabilitation Exercise Motion Tracking, University of Waterloo, 2012.

*Primary Examiner* — Mohamed Charioui
(74) *Attorney, Agent, or Firm* — Lieberman & Brandsdorfer, LLC

(57) ABSTRACT

Embodiments relate to a system, program product, and method for use and an artificial intelligence (AI) platform to identify and analyze physical forces related to sensory input. A sensor operatively coupled to an inertial measurement unit (IMU) is activated. An initial position of the IMU responsive to the sensor activation is captured and movement of the IMU from the initial position is recognized. A comparison is preformed, where the captured initial position is compared to a second position which is correlated with the recognized movement. A score based on the performed comparison is determined and a diagnostic assessment based on the performed comparison and determined score is created. The diagnostic assessment is converted to feedback, where the conversion utilizes real-time communication of an instruction of a second movement position of the IMU. Receipt of the feedback physically conveys a manifestation of the feedback to the apparatus.

20 Claims, 10 Drawing Sheets

(56) References Cited

U.S. PATENT DOCUMENTS

| | | | |
|---|---|---|---|
| 2015/0141889 A1* | 5/2015 | Ha | A61F 5/0102 |
| | | | 602/16 |
| 2015/0272482 A1* | 10/2015 | Houmanfar | A61B 5/7267 |
| | | | 600/595 |
| 2015/0310280 A1* | 10/2015 | Bentley | G06K 9/00711 |
| | | | 382/103 |
| 2015/0343263 A1 | 12/2015 | Sampath | |
| 2015/0370326 A1* | 12/2015 | Chapeskie | G06F 3/014 |
| | | | 345/156 |
| 2017/0042467 A1 | 2/2017 | Herr et al. | |
| 2017/0106189 A1 | 4/2017 | Keller et al. | |
| 2017/0136296 A1 | 5/2017 | Barrera et al. | |
| 2017/0181698 A1 | 6/2017 | Wiedenhoefer et al. | |
| 2017/0192496 A1 | 7/2017 | Balslev et al. | |
| 2017/0312576 A1* | 11/2017 | Natarajan | A61B 5/486 |
| 2017/0315620 A1* | 11/2017 | Johri | G06F 3/0304 |
| 2018/0052517 A1* | 2/2018 | Bulgarelli | G06F 3/0346 |
| 2018/0070864 A1* | 3/2018 | Schuster | A61B 5/0077 |
| 2018/0153430 A1* | 6/2018 | Ang | A61B 5/389 |
| 2020/0015712 A1* | 1/2020 | Hayashida | H04W 4/38 |

* cited by examiner

INTERACTIVE EXERCISE EXPERIENCE

BACKGROUND

The present embodiments relate to incorporating real-time feedback with a motion diagnostic tool. More specifically, the embodiments relate to an artificial intelligence platform to incorporate sensory input and output for an interactive physical exercise experience.

Physical activity comes in different forms and takes place in different venues. Similarly, physical activity may be controlled or uncontrolled. It is understood that controlled physical therapy may be in the form of self-induced exercise regimen, or may be overseen by a trainer or physical therapist. Physical therapy is a branch of rehabilitative health that uses specifically designed exercises and equipment to help patients regain or improve their physical abilities. Patients may participate in physical therapy for various reasons, including post-surgery, or healing from an injury. Similarly, as our population ages, physical therapy is needed for our aging population to maintain a controlled environment of physical activity.

Most patients that receive physical therapy have specific goals to achieve through the therapy. At the same time, health insurance may require that specific goals be met within a defined period of time. The most obvious way to measure physical therapy progress for the patient is to track pain and mobility leaves as the therapy progresses. At the same time, outcome data empowers physical therapists to effectively prove their value and clinical level performance. There are tools available to measure physical activity, such as how many steps were walked in a period of time, or how many miles were walked, etc. These tools are limited to measurement of distance with respect to time.

There are advantages that may be attached to these exercise tracking tools. However, like most tools, they have their drawbacks. Many of these drawbacks can be attributed to limited feedback. More specifically, these tools are relatively one-dimensional with respect to the data tracking and associated feedback.

SUMMARY

The embodiments include a system, computer program product, and method for simulating object interaction through leveraging an artificial intelligence platform.

In one aspect, a system is provided for use with an artificial intelligence (AI) platform for identifying and analyzing physical forces related to sensory input. The system includes an apparatus including a processing unit operatively coupled to memory, a sensor operatively coupled to the processing unit, and an inertial measurement unit (IMU) operatively coupled to the sensor. The AI platform, which is in communication with the apparatus, includes tools therein to facilitate identifying and analyzing physical forces. The tools include a detection engine to track progress of motion upon activation of the AI platform. The detection engine captures an initial position of the IMU and recognizes movement of the IMU from the initial position. The detection engine also compares the captured initial position to a second position correlated with the recognized movement. A score is determined based on the performed comparison and a diagnostic assessment is created based on the performed comparison and determined score. The diagnostic assessment is converted to feedback, where the conversion utilizes real-time communication of an instruction of a second movement position of the IMU. Receipt of the feedback physically conveys a manifestation of the feedback to the apparatus.

In another aspect, a computer program product is provided for identifying and analyzing physical forces related to sensory input in an artificial intelligence (AI) platform. The computer program product includes a computer readable storage device having program code embodied therewith that is executable by a processing unit. Program code is provided to capture an initial position of an inertial measurement unit (IMU) operatively coupled to the AI platform. Program code is also provided to recognize movement of the IMU from the initial position and perform a comparison including comparing the captured initial position to a second position correlated with the recognized movement. Program code is further provided to determine a score based on the performed comparison and create a diagnostic assessment based on the performed comparison and determined score. Program code is also provided to convert the diagnostic assessment to feedback, the conversion utilizing real-time communication of an instruction of a second movement position of the IMU. Receipt of the feedback physically conveys a manifestation of the feedback to the apparatus.

In yet a further aspect, a method is provided for identifying and analyzing physical forces related to sensory input. The method includes activating a sensor operatively coupled to an inertial measurement unit (IMU). An initial position of the IMU responsive to the sensor activation is captured and movement of the IMU from the initial position is recognized. A comparison is preformed, including comparing the captured initial position to a second position correlated with the recognized movement. The method also includes determining a score based on the performed comparison and creating a diagnostic assessment based on the performed comparison and determined score. The diagnostic assessment is converted to feedback, where the conversion utilizes real-time communication of an instruction of a second movement position of the IMU. Receipt of the feedback physically conveys a manifestation of the feedback to the apparatus.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of physical therapy, it is understood and recognized that different people have different physical limitations and associated therapy goals. Current data tracking and modeling tools may track progression of exercise endurance but they do not track the exercise and associated exercise motion. The tools and processes shown and described herein are directed at and invoke continuous quantitative progress measurement. Movements and associated motion are tracked in real-time, with measurements of motion, acceleration, and angle taking place. Evaluation of the motion and associated data takes place dynamically with real-time feedback.

Figure 1:
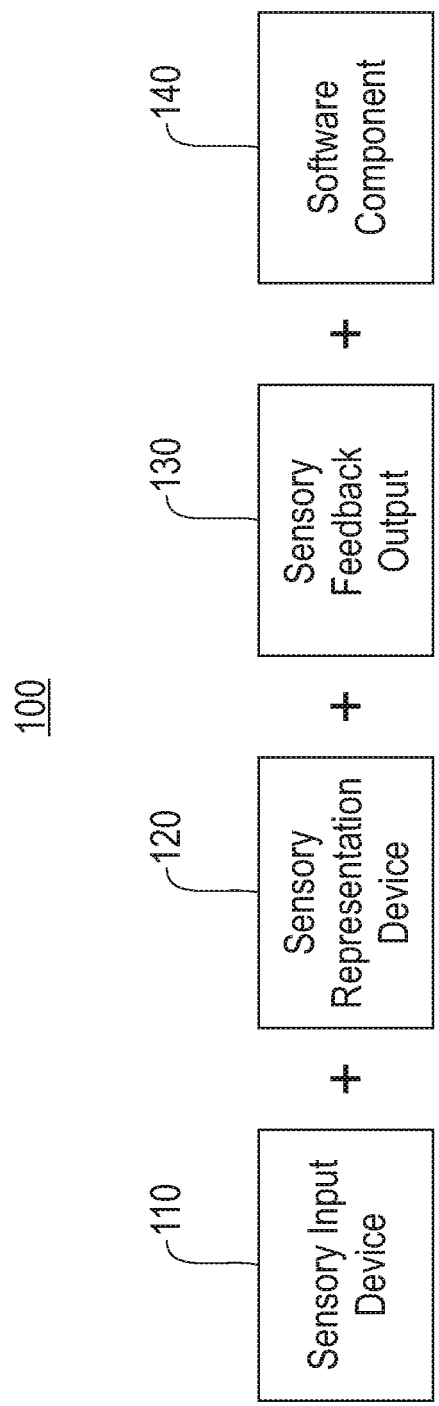
FIG. 1 depicts a system diagram illustrating a content and response system connected in a network environment that uses a knowledge engine to identify and analyze physical forces related to sensory input.

Referring to FIG. 1, a diagram (100) is provided to depict an abstract representation of the system components. As shown, there are three hardware components, including a sensory input device (110), a sensory representation device (120), and a sensory output device (130). In addition, there is a software component, (140) for scenario modeling. The software component (140) is in communication with both the sensory input and output devices (110) and (130), respectively. More specifically, the software component quantifies, or otherwise converts the sensory input (110) to a corresponding value, and incorporates the quantified value into the representation (120). Output from the representation is quantified and converted to a sensory medium by the software component (140). The sensory output device (130) communicates the quantified representation via a sensory output medium.

Sensory processing refers to the ability to interpret sensory stimuli from a sensory modality. The stimuli may be directed, but not limited to, vision, hearing, tactile, etc. The sensory input device (110) is configured to receive input directed from a specific modality, or a combination of two or more modalities. For example, the input device (110) may be a sensor to convey force input to the selected object. Measurement of sensory input is ascertained from the input device (110) and communicated to the software component (140). In one embodiment, the measurement from the input device (110) is an estimate of the physical force, e.g. magnitude and direction, or in one embodiment motion, to be simulated on a selected or designated object or medium, e.g. visual display. Physical characteristics of the selected object together with the estimated physical force(s) are used to model expected behavior. In one embodiment, the modeling is conveyed through the multi-sensory representation hardware (120). At the same time, the behavior of the selected object and associated force are modeled and conveyed to the sensory output device (130). One or more sensory feedback sensors are utilized as part of the output device (130) to communicate an experience of the modeled behavior. For example, in one embodiment, a haptic feedback sensor models the effect of the modeled force on the selected object. Accordingly, a combination of hardware and software components are utilized to model physical forces based on sensory input to provide sensory output to convey reactivity to the modeled physical forces.

Figure 2:
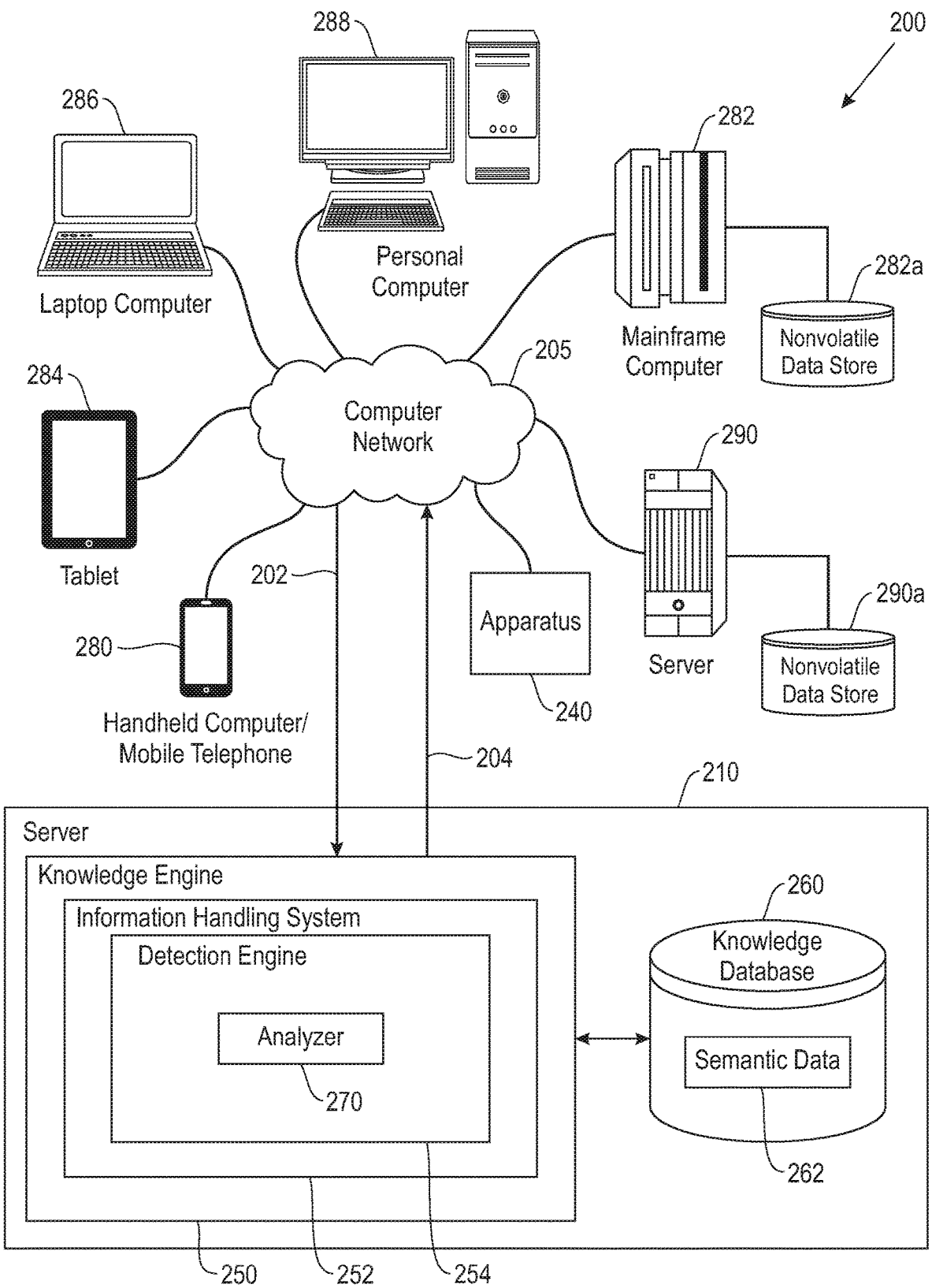
FIG. 2 depicts a schematic diagram of an artificial intelligence system.

Referring to FIG. 2, a schematic diagram of an artificial intelligence system (200) is depicted. As shown, a server (210) is provided in communication with a plurality of computing devices (280), (282), (284), (286), and (288) across a network connection (205). The server (210) is configured with a processing unit in communication with memory across a bus. The server (210) is shown with a knowledge engine (250) for sensory processing and modeling over the network (205). As shown, an apparatus (240) is shown operatively coupled to the network (205). A detailed description of the apparatus (240) is shown and described in FIG. 3. One or more computing devices (280), (282), (284), (286) and (288) are also shown operatively coupled to the network (205). In one embodiment, the apparatus (240) may be locally coupled to one or more of the computing devices (280)-(288), or the network (205), as shown. The computing devices (280), (282), (284), (286), and (288) communicate with each other and with other devices or components via one or more wired and/or wireless data communication links, where each communication link may comprise one or more of wires, routers, switches, transmitters, receivers, or the like. In this networked arrangement, the server (210) and the network connection (205) may enable sensory processing and modeling for one or more subjects. Other embodiments of the server (210) may be used with components, systems, sub-systems, and/or devices other than those that are depicted herein.

The knowledge engine (250) is configured to receive input from various sources. For example, knowledge engine (250) may receive input from the network (205), one or more knowledge bases of corpus (260) of semantic data (262), or other data, content users, and other possible sources of input. In selected embodiments, the knowledge base (260) also referred to herein as corpus, may include structured, semi-structured, and/or unstructured content that are contained in one or more large knowledge databases or corpus. The various computing devices (280), (282), (284), (286), and (288) in communication with the network (205) may include access points for content creators and content users. Some of the computing devices may include devices for a database storing the corpus of data as the body of information used by the knowledge engine (250) to generate a movement instruction and an outcome across communication channel (204). The network (205) may include local network connections and remote connections in various embodiments, such that the knowledge engine (250) may operate in environments of any size, including local and global, e.g. the Internet. Additionally, the knowledge engine (250) serves as a front-end system that can make available a variety of knowledge extracted from or represented in documents, network accessible sources and/or structured data sources. In this manner, some processes populate the knowledge engine (250) with the semantic data (262) also including input interfaces to receive requests and respond accordingly.

As shown, content may be in the form of semantic data (262) for use as part of the corpus (260) of data with the knowledge engine (250). The corpus (260) may include any structured and unstructured documents, including but not limited to any file, text, article, or source of data (e.g. scholarly articles, dictionary, definitions, encyclopedia references, and the like) for use by the knowledge engine (250). Content users may access the knowledge engine (250) via a network connection or an internet connection to the network (205), and may submit data to the knowledge engine (250) that may effectively determine an outcome of a movement and associated movement instructions by searching content in the corpus of data. As further described below, when a process evaluates semantic content related to the sensory input in the form of movement data, the process can use a variety of conventions to query content from the knowledge engine (250). In one embodiment, semantic content is content based on the factual data ascertained via scientific principles. The semantic content may also interpret an expression, such as by using Natural Language (NL) processing. In one embodiment, the process sends content across an input communication channel (202) to the knowledge engine (250), so that the content may be interpreted and the knowledge engine (250) may provide a response in the form of one or more movement instructions across the outcome communication channel (204).

In some illustrative embodiments, server (210) may be the IBM Watson® system available from International Business Machines Corporation of Armonk, New York, which is augmented with the mechanisms of the illustrative embodiments described hereafter. The IBM Watson® knowledge engine (250) may receive input content (202), which in one embodiment may be from a sensory input device, such as apparatus (240), which it then parses to extract the movement data that in turn are then applied to the corpus of data stored in the knowledge base (260). Based on application of the content to the corpus of data, a candidate model and expected behavior is generated by looking across the corpus of data for portions of the corpus of data that have potential for containing a matching outcome to the submitted content.

In particular, received content may be processed by the IBM Watson® server (210) which performs analysis on the scenario being modeled and the magnitude of the input content in each of the portions of the corpus of data found during application of the content using a variety of reasoning algorithms. There may be multiple reasoning algorithms applied, each of which performs different analysis, e.g., comparisons, and generates a score. For example, one or more reasoning algorithms may look at the matching of parameters of the scenario, such as the object that is the subject of the scenario, within the input content and the found portions of the corpus of data. Other reasoning algorithms may look at temporal or spatial features in the scenario, while others may evaluate the source of the portion of the corpus of data and evaluate its veracity.

Scores obtained from the various reasoning algorithms indicate the extent to which a potential response, e.g. modified movement instructions, is inferred by the input content based on the specific area of focus of that reasoning algorithm. Each resulting score is weighted against a statistical model. The statistical model may be used to summarize a level of confidence that the IBM Watson® system has regarding the evidence that the potential response, i.e., modified movement instructions, is inferred by the submitted content. This process may be repeated for each of the candidate outcomes until the IBM Watson® system (210) identifies candidate outcomes that surface as being significantly stronger than others and thus, generates a final outcome, or ranked set of outcomes, for the input content.

To process sensory input data, the system (210) may include an information handling system (252) which uses a detection engine (254) to translate the sensory input data and convert the input data into one or more physical parameters. Though shown as being embodied in or integrated with the server (210), the information handling system (252) and/or detection engine (254) may be implemented in a separate computing system (e.g., 290) that is connected across network (205) to the server (210). Wherever embodied, the detection engine (254) detects and categorizes sensory input data, one or more scenarios for application of the input data, including object characteristics and metadata, and identifies a best solution with respect to maintaining or modifying movement instructions for the detected input data and scenario by modeling based on the characteristic metadata.

In selected example embodiments, the detection engine (254) may include an analyzer (270) that is configured to model an expected behavior of a selected subject based upon current and past movement data. Characteristics of the subject, and in one embodiment, an associated environment where the subject is contained, are stored in the corpus. The knowledge base (260), and specifically the semantic data (262), includes object and associated parameter data. As described in more detail with reference to FIGS. 3-7, the analyzer (270) may perform a structure analysis as related to physical parameters of the subject, and in one embodiment associated environment data. The analyzer (270) may also be configured to apply one or more learning methods to match a detected pattern to known patterns to decide and categorize the movement instruction(s).

As shown, the detection engine (254) employs a sub-engine in the form of the analyzer (270) to support resolution of the modeled object. The analyzer (270) models a force from the sensory input as it is applied to the apparatus (240), and generates feedback data. In one embodiment, the created model represents a combination of different forces. The analyzer (270) converts the generated feedback data to one or more movement instructions. For example, in one embodiment, the sensory platform for the feedback data is the same as the sensory input platform, e.g. apparatus (240). The knowledge engine (250) communicates the feedback data to an identified sensory output device (240) across the outcome communication channel (204).

To evaluate which of the potential outcomes best corresponds to the selected object and/or environment and the detected sensor data, the detection engine (254) may be configured to use characteristics and associated defining data of the subject and/or environment to determine and score potential combinations based on scenario alignments. For example, the detection engine (254) may utilize the analyzer (270) for identifying appropriate scientific principles and physical properties, and applying an outcome analysis to look at the object-environment-input data relationships. The analyzer (270) may apply a learning method for previous similar object-environment-input relationships in a similar combination. The combination together with a target outcome may be presented to the corpus (260) for evidence from the characteristics and any corpus references that are used to help the determination.

The analyzer (270) searches the corpus (260) for evidence of the scientific principles and the sensory input data. The analyzer (270) applies a score according to its incidence in the corpus (260). An outcome for the analyzer (270) is in the form of output data that matches or closely matches the submitted input as applied to the selected subject. The outcome may be based on a scoring applied to two or more matches in the corpus, and in one embodiment, an associated ranking of a plurality of potential outcomes.

Types of devices that can utilize system (210) range from small handheld devices, such as handheld computer/mobile telephone (280) to large mainframe systems, such as mainframe computer (282). Examples of handheld computer (280) include personal digital assistants (PDAs), personal entertainment devices, and mobile smartphone devices. Other examples of information handling systems include pen, or tablet, computer (284), laptop, or notebook, computer (286), personal computer system (288), and server (290). Similarly, input devices that can utilize system (210), includes, but are not limited to input device (240). The input device (240) may be locally couples to one or more of the devices (280)-(288), or coupled to the network (205). As shown, the input device (240) and devices (280)-(288) can be networked together using computer network (205). Types of computer network (205) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the devices utilize data and data storage devices, such as nonvolatile data stores, such as hard drives and/or nonvolatile memory. Some of the devices may use separate nonvolatile data stores (e.g., server (290) utilizes nonvolatile data store (290a), and mainframe computer (282) utilizes nonvolatile data store (282a)). The nonvolatile data store (282a) can be a component that is external to the various information handling systems or can be internal to one of the information handling systems.

Figure 3:
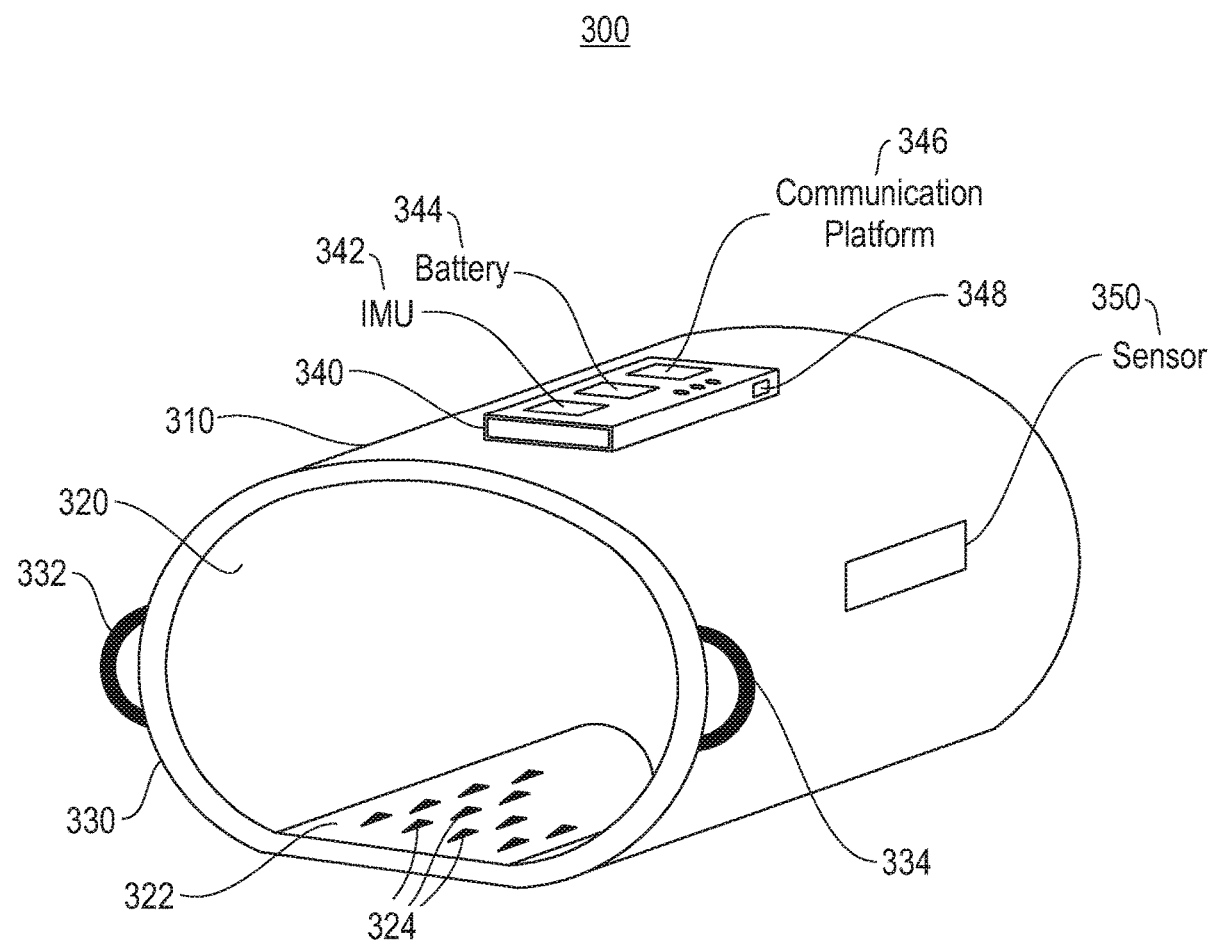
FIG. 3 depicts a block diagram illustrating an example of an apparatus to be employed in support of the movement.

Referring to FIG. 3, a diagram (300) is provided illustrating an example of an apparatus to be employed in support of the movement. As shown, the apparatus (310) is configured with an opening (320). This opening (320) is configured to receive a limb or body part of a subject. For example, the opening may be configured to receive a hand or a foot. Regardless of the body part, the apparatus (310) is configured for hands-free use, positioning, activation, and de-activation. At the same time, that apparatus is configured for safe use. It is understood that the subject may be participating in physical therapy, whether in recovery from an accident or old age, the goal is to increase strength and endurance, and to mitigate any further injury. As such, a plurality of raised elements (324), e.g. ridges, are shown position on a surface (322) of the opening (324). The raised elements (324) function as a frictional element with the received limb and to prevent slipping of the apparatus from the received limb.

One or more hooks (332) and (334) are shown positioned on an external surface (330) of the apparatus and adjacent to the opening (320). Although two hooks (332) and (334) are shown herein, the quantity should not be considered limiting. The hooks (332) and (334) are provided to facilitate removal of the apparatus from the limb in a hands-free motion. For example, one or more of the hooks (332) and (334) may be positioned next to a secondary surface, and application of force to the secondary surface would dislodge the apparatus (310) from the limb. Conversely, in one embodiment, application of a reverse force on the hooks (332) and (334) may be utilized to secure or more tightly position the apparatus (310) with respect to the limb. Accordingly, the hooks (332) and (334) are positioned on or next to an external area of the apparatus to contribute the hands-free characteristics thereof.

As further shown, an inertial measurement unit (IMU) (342) is positioned in communication with the apparatus (310). In one embodiment, and as shown herein, a housing (340) is positioned proximal to the apparatus (310), e.g. apparatus body. The IMU (342) is positioned within the housing (340) relative to the apparatus (310), although the position of the IMU (342) with respect to the apparatus (310) should not be considered limiting. In one embodiment, the IMU (342) is embedded within the apparatus (310), e.g. apparatus body. The IMU (342) is operatively coupled to a battery (344) and a communication platform (346), e.g. Bluetooth. As further shown, a socket (348) is provided for battery charging. The communication platform (346) enables the IMU to send and receive data across a network connection. For example, in one embodiment, the apparatus is cloud enabled, with the data gathered by the IMU (340) transmitted, e.g. wirelessly, across a network connection to a cloud supported apparatus. Accordingly, the apparatus (310) is configured with hardware in communication with one or more processing enabled tools.

The apparatus (310) is configured for hands-free activation and to track motion and displacement data associated with an exercise routine. To use the apparatus (310), the subject slips a limb, e.g., hand, foot, arm, legs, etc., into the opening (320). A sensor (350) is positioned in communication with the apparatus (310) to support activation and de-activation. The sensor (350) is shown positioned on an external surface of the apparatus (310), although in one embodiment, the sensor may be positioned on an internal surface, e.g. within the opening (320). In one embodiment, the sensor (350) is a capacitive sensor and is activated in response to receipt touch or pressure. Similarly, in one embodiment, the sensor (350) is automatically activated when the apparatus (310) is affixed onto the limb. For example, the sensor (350) may be incorporated into the raised elements (324). Once the sensor (350) is activated, the subject is prompted to start their exercise. The IMU (340) detects movement of the apparatus (310) and gathers associated data for measurement and evaluation. See FIG. 7 for a detailed description of the measurement and evaluation. Accordingly, the physical elements of the apparatus (310) are provided to support real-time feedback, including hits and misses, and any suggested modifications.

Figure 4:
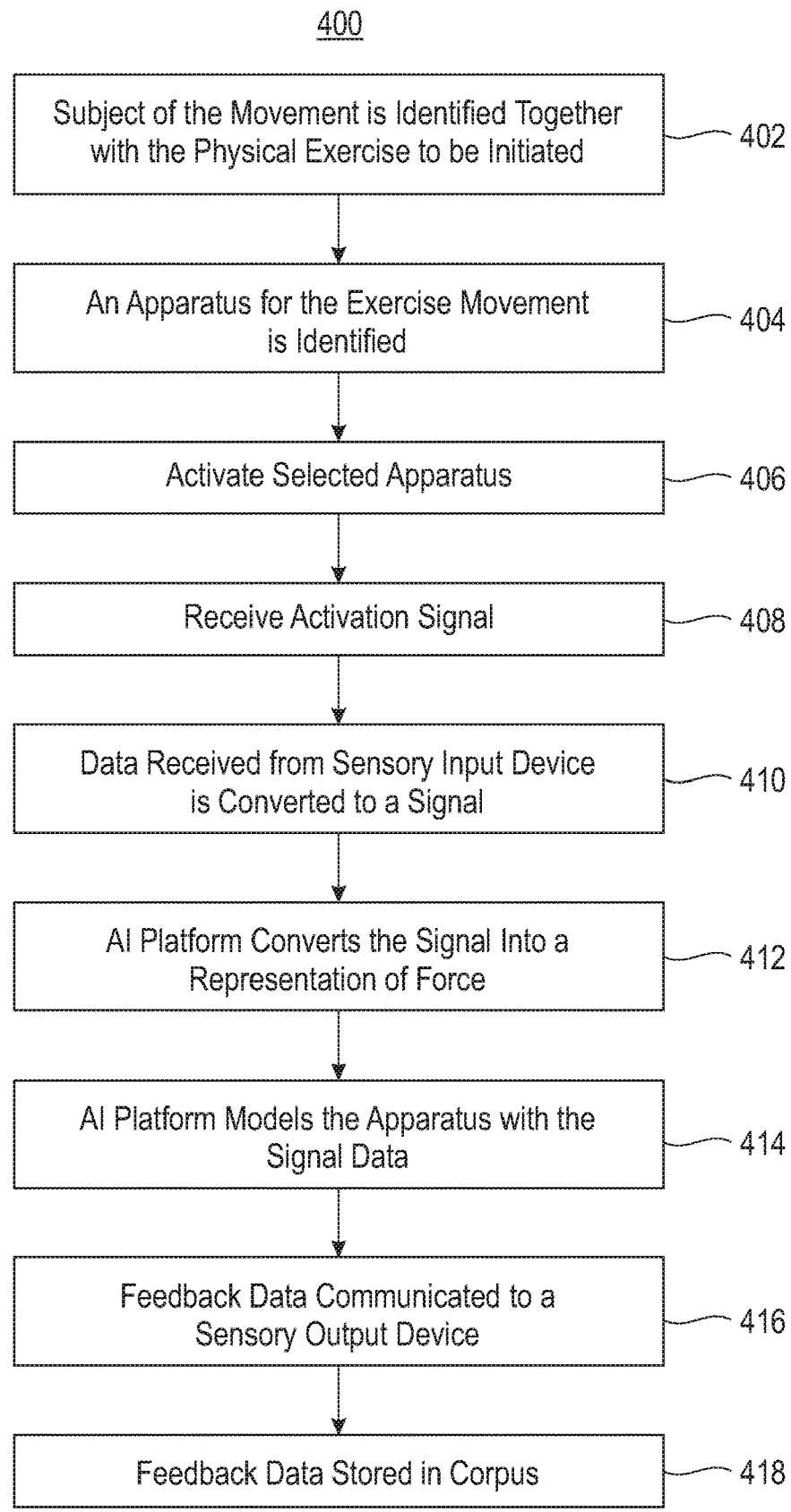
FIG. 4 depicts a flow chart diagrammatically illustrating a learning phase of the artificial intelligence platform.

To provide additional details for an improved understanding of selected embodiments of the present disclosure, reference is now made to FIG. 4 which diagrammatically illustrates a learning phase of the artificial intelligence platform in flow chart (400). In the example shown and described, motion and/or force are received as input and applied to a select object. Objects may vary in size, dimension, and material, with each of these parameters playing a role on application of input to be applied to the object. Prior to initiating any exercise movement, the subject of the movement is identified together with the physical exercise to be initiated (402). It is understood that each person has different physical characteristics and abilities, and as such the movement goals and associated motions are individualized. Following the identification at step (402), an apparatus for the exercise movement is identified (404). In one embodiment, a menu of available objects is provided, and the object size, material, and/or dimensions are selected from the menu. In one embodiment, the size of the selected object is fixed or variable, with the variable object size allowing for selecting or identification of the object size. An example of an apparatus is shown and described in FIG. 3. However, this is merely one example of an apparatus, and as such should not be considered limiting. It is understood that the apparatus may be for strength and mobility exercise, or in one embodiment for rehabilitation exercise. In one embodiment, the subject of the exercise movement has an identifier that is matched or registered with an identifier of the apparatus, so that the subject and the apparatus may be tracked during the exercise movement. Accordingly, the apparatus is identified and selected based on the identified exercise movement.

The selected apparatus is activated at the start of or to initiate the exercise movement (406). A signal related to the activation input is received (408). Input may be received from one or more sensors positioned or embedded with the selected apparatus. With respect to use of the apparatus, an IMU, or in one embodiment, one or more alternative or additional sensors are provided to detect motion and motion related data of the apparatus. The motion data, also referred to herein as sensory input, is translated to a format conducive to an artificial intelligence platform. For example, the sensory input may be converted to a force or displacement proportional to the subject and the associated exercise. In one embodiment, the sensory input may be in the form of a button configured to receive a force, with the length of time the button is actuated being the input value that is converted to a proportional force. Accordingly, the initial steps in the learning phase include selection of the subject, identified herein as the object, and receipt of sensory input.

Data received from the sensory input device, or in one embodiment, a combination of two or more sensory input devices, is converted into a signal (410). Following receipt of the signal (410), the artificial intelligence platform converts the signal into a representation of magnitude and direction of force applied to the apparatus (412). In one embodiment, the converted signal produces an estimate of force applied to the selected apparatus, with the force estimation including magnitude and direction. The artificial intelligence platform models the apparatus together with the signal data (414). The modeling at step (414) creates feedback data and communicates a signal commensurate with the generated feedback to a sensory output device (416). In one embodiment, the sensory output is proportional to the feedback. A sensory output device in receipt of the sensory output may in the same sensory medium as the input or in one embodiment, a different sensory medium. In one embodiment, the feedback is returned to the feedback output device in real-time. In addition to communicating the feedback signal, feedback data is created and stored in the corpus (418). In one embodiment, the entry in the corpus includes apparatus and subject data and the input signal data is stored together with the feedback data. Accordingly, the learning phase provides feedback data and stores an entry in the corpus with details of the input and the associated feedback.

The learning phase shown and described in FIG. 4 is directed at both building the corpus and creating feedback in real-time. As the corpus grows with data entries, the artificial intelligence platform learns. The force applied to the identified apparatus may also include time duration of the applied and detected force. The sensory output received by the output device correlates to the duration and distance of object movement.

Figure 5:
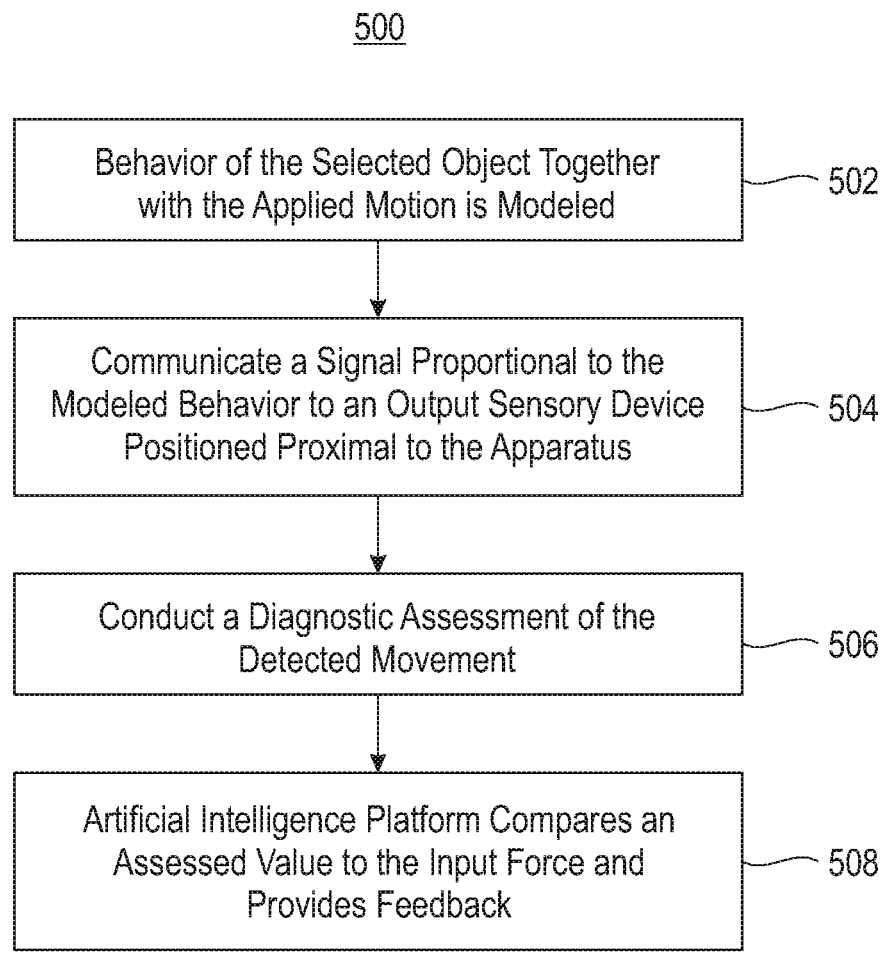
FIG. 5 depicts a flow chart illustrating an assessment phase of the artificial intelligence platform.

Referring to FIG. 5, a flow chart (500) is provided illustrating an assessment phase of the artificial intelligence platform. The assessment phase may align with the learning phase. For example, in one embodiment, the subject participating in the exercise may have specific goals, such as, but not limited to, duration of the exercise, detected displacement, force, etc. Whether or not the subject is meeting that goals, feedback may be applied in real-time to the subject. In addition, the generated data may be transmitted to a secondary location for review and assessment. Feedback may come in different forms. For example, in one embodiment, feedback may include a modification of the exercise, or a change to a different exercise. Feedback may be visual, such as a visual display to demonstrate the intended movement, or in one embodiment to display the actual movement.

As shown and described in FIG. 5, the assessment phase is in conjunction with or subsequent to the learning phase shown and described in FIG. 4. The assessment phase may be employed to correct any deficiencies identified in attaining the exercise goals. Behavior of the selected object together with the applied motion is modeled (502). In one embodiment, the object modeling may take place on a visual display. Similarly, in a sensory input and output environment, the object modeling may include communication of a signal proportional to the modeled behavior and may be communicated to an output sensory device positioned proximal to the apparatus (504). For example, in a non-visual environment, the modeled output may be haptic or auditory or a combination thereof. Following the objected modeling, a diagnostic assessment of the detected movement, such as force and/or motion, is conducted (506). The diagnostic assessment provides a venue for interactive learning and to experience the force and its impact. The diagnostic assessment may be in the form of a menu of force values for selection. Similarly, in one embodiment, the diagnostic assessment is in the form of input from a sensory input device. After the assessment value is received, the artificial intelligence platform compares an assessed value to the input force and provides feedback (508). In some embodiments, the artificial intelligence platform includes two or more motion tracking algorithms operatively coupled to the IMU, and the artificial intelligence platform will select at least one of the algorithms based on the feedback. For example, in one embodiment, the feedback is an indication of whether the assessed value is the same as the input force, or a degree of distance between the assessed value and the input force. Accordingly, the assessment phase provides a venue for interactive learning and experiencing the physical exercise and its impact.

Figure 6:
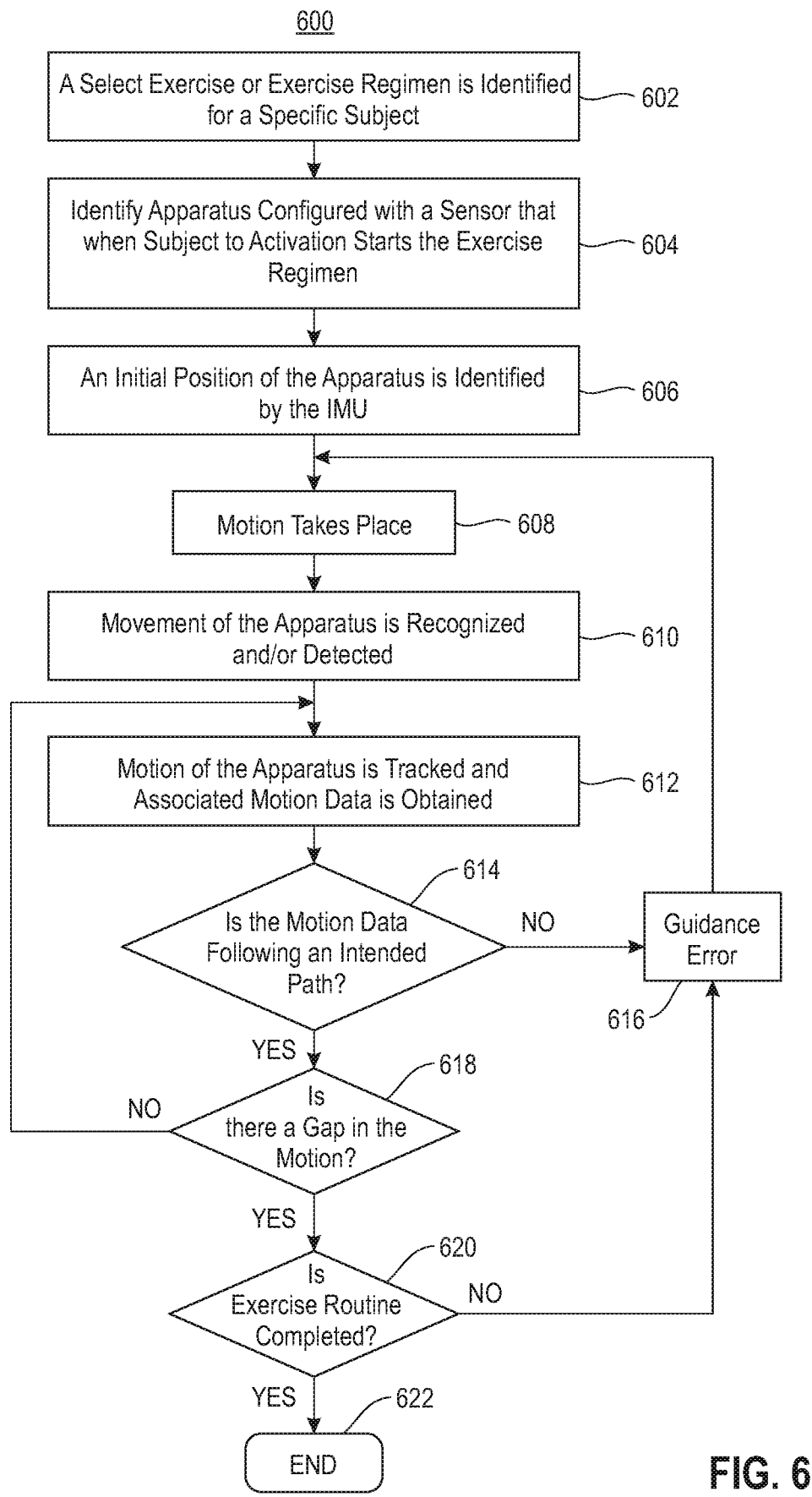
FIG. 6 depicts a block diagram illustrating a combination process for an artificial intelligence platform learning and assessment behavior modeling that incorporates aspects of the learning phase shown in FIG. 4, and the assessment phase shown in FIG. 5.

Referring to FIG. 6, a block diagram (600) is provided illustrating a combination process for an artificial intelligence platform learning and assessment behavior modeling that incorporates aspects of the learning phase shown in FIG. 4, and the assessment phase shown in FIG. 5. A select exercise or exercise regimen is identified for a specific subject (602). In one embodiment, the subject is identified, and an associated apparatus is selected. Similarly, in one embodiment, the apparatus is paired to the subject. There are various embodiments that may be employed for the identification and pairing. For example, in one embodiment, natural language processing may be utilized to identify the subject, the apparatus, and the associated exercise regimen. The apparatus is configured with a sensor that when subject to activation starts the exercise regimen (604), or in one embodiment starts to sense and record any movements of the apparatus. In one embodiment, the apparatus is a hands-free apparatus that may be positioned and activated without the use of hands to start the regimen, and may similarly be de-activated at the completion of the regimen. Accordingly, the apparatus is subject to activation and de-activation, with the activation and de-activation directed at the corresponding exercise regimen.

As shown and described, the apparatus may be configured with an inertial measurement unit (IMU) (e.g. IMU (340)) or an alternative or ancillary tool to measure movement of the apparatus. Following activation of the apparatus, the initial position of the apparatus is identified by the IMU (606). As motion takes place (608), movement of the apparatus is recognized and/or detected (610). The motion of the apparatus is tracked and associated motion data is obtained (612). Since the goal is for the subject to follow a specified exercise regimen, the motion data is evaluated to determine if it is following an intended path (614). In one embodiment, for example, a comparison is performed, including comparing the captured initial position to a second position correlated with the recognized movement. Also, in one embodiment, there may be an inherent error rate associated with the motion, and as such the determination at step (614) includes the error rate in the assessment. Similarly, in one embodiment, the motion of the apparatus is presented on a visual display so that the subject may visually observe the motion. For example, in one embodiment, the exercise may be directed at the motion and an associated smoothness of the motion. If at step (614) it is determined that the movement is not following the intended path, guidance is provided to the subject on the error and what needs to be done to follow the correct path (616). The guidance may be oral, such as oral instructions, visual, such as a presentation on a visual display, or a combination of oral and visual instructions. The guidance at step (616) is conveyed in real-time so that there is minimal or no delay in the associated movement correction, and the process returns to step (608) to continue tracking movement and motion. Accordingly, the feedback to the subject is dynamically invoked to mitigate any delays.

It is understood that the subject may start and stop specific movement and motion during the exercise regimen. Some changes on movement and motion may be expected, and some may not be expected or acceptable. Following a positive response to the determination at step (614), it is determined if there is a gap in the movement or motion (618), e.g. no movement or motion detected. In one embodiment, the assessment at step (618) may be based on the specific exercise regimen and a gap in receipt of data from the IMU. Similarly, although the assessment at step (618) is shown following the assessment at step (614), the assessment may take place at any time a deviation between the exercise regimen and sensed data is identified. A negative response to the determination at step (616) is an indication that the exercise is continuing and the process returns to step (612). Conversely, a positive response to the determination at step (616) is followed by a determining if the regimen has concluded in a timely manner (620), e.g. not prematurely. A negative response is followed by a return to step (616) to provide guidance to the subject on the intended motion, and a positive response concludes the regimen (622). Accordingly, real-time feedback is provided to support the subject through the exercise regimen to ensure and support management of progression of the subject.

Figure 7:
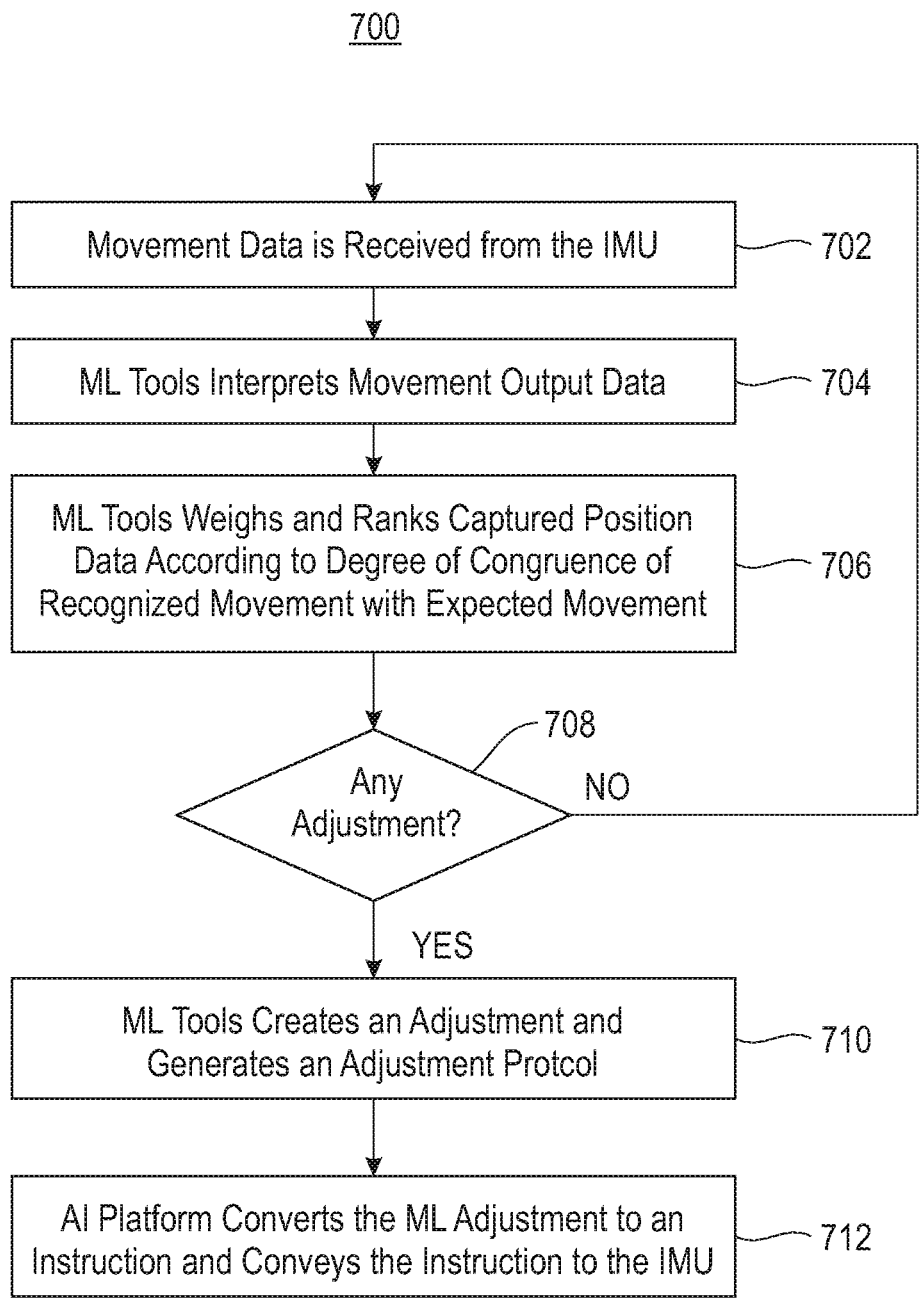
FIG. 7 depicts a flow diagram illustrating evaluation of the movement data.

In addition to real-time feedback, data detected by the IMU is gathered and communicated to a remote device for further assessment and evaluation. Referring to FIG. 7, a flow chart (700) is provided illustrating evaluation of the movement data. Processing of the movement data utilizes artificial intelligence (AI) and machine learning (ML) elements to assess the subject and associated movement, as well as interpret the gathered data. Before a subject starts a regimen there are certain expectations. Similarly, after the subject starts the regimen there are certain expectations, although such expectations may be subject to adjustment based on progress, or in one embodiment lack thereof. As movement data is received from the IMU (702), a ML tool that is operatively coupled to the AI platform, as shown in FIG. 1, interprets movement output data (704). In one embodiment, the interpretation includes an evaluation of various factors, including the actual movement, the intended movement, the apparatus, and the subject. In addition to interpretation, the ML tool weighs and ranks captured position data of the apparatus according to a degree of congruence of the recognized movement with the expected movement (706). It is understood that the movement data is subject to interpretation. In one embodiment, the ML tool leverages data in an associated corpus in the interpretation and evaluation at steps (704) and (706). For example, prior data with respect to the subject and/or the exercise may be available in the corpus. Accordingly, the ML tool leverages the corpus for evaluating the subject.

As shown in FIG. 6, adjustments to the exercise regimen may be warranted. More specifically, the interpretation and evaluation at steps (704) and (706) may contribute to any adjustments that may be suggested or required. The adjustment may be a modification of a current exercise, a change in the exercise routine, or in one embodiment a physical change of the apparatus, including but not limited to change of the apparatus from a first physical state to a second physical state. For example, in one embodiment, the physical state of the apparatus may change the shape, size, or function of the apparatus, which when correlated with an exercise or exercise routine, enables the determined adjustment. Either or both of these modifications may require a change in the position or placement of the exercise apparatus. Similarly, the adjustment may be in the form of an oral or visual queue to the subject. Following steps (706), it is determined if there is any adjustment or change following the evaluation (708). A negative response is followed by continued movement and associated detection thereof, as demonstrated by a return to step (702). In one embodiment, the ML tool may issue an oral instruction to the subject to continue with the exercise. Similarly, in one embodiment, the ML tool may issue a visual instruction to the subject to continue with the exercise via an associated visual display. Following a positive response to the determination at step (708), the ML tool creates an adjustment to the regimen via generating an adjustment protocol the apparatus (710). The AI platform converts the ML generated adjustment to an instruction and conveys the instruction to the IMU (712). Accordingly, the AI platform is employed to interpret movement data directed at the subject and to dynamically create and invoke adjustments to the associated movement instructions.

It is understood that the exercise regimen and associated motion may require multiple movements and associated motion thereof. The ML tool shown and described in FIG. 7 evaluates the motion of the IMU across multiple data points, e.g. movement across two or more positions. The interpretation and evaluation at step (704) and (706) includes this motion evaluation. More specifically, the ML tool may identify a specific motion between two data points that is not meeting expectations of that which is requirement, and the associated adjustment may be directed at an algorithm within the exercise routine in an effort to meet the intended motion.

The movement analysis of the apparatus takes place in real-time. In one embodiment, the analysis may be sequential. The associated movement data, and in one embodiment metadata, is stored in the corpus, e.g. knowledge engine (260). The building of the corpus addresses the artificial intelligence component and enables the data in the corpus to grow and for the system to learn. An output signal is communicated to the apparatus (240), and in one embodiment conveyed to a visual display to visually demonstrate the movement, e.g. intended motion versus actual motion. The output device is selected or in one embodiment pre-selected. For example, the output device may be the same as the input device, or the same sensory medium as the input device. Similarly, in one embodiment, the output device is a different sensory medium than the input device. Accordingly, the corpus is employed to ascertain a corresponding value to motion data and associated force(s), which is translated into a corresponding output value.

As shown in FIGS. 1-7, force calculations take place on a real-object and based on physical input. The sensory input and output device(s) provide tools for interaction with the subject and the associated force being evaluated. Although in some embodiments a single force is demonstrated, it is understood that multiple forces on a single object or multiple objects may be applied and simulated. Accordingly, the system and supporting methods provide an interactive learning and experiencing environment to articulate force and its associated impact.

Aspects of dynamic movement environment shown and described in FIGS. 1-7 employ one or more functional tools to support balancing performance, sensory input, and sensory output, together with the artificial intelligence platform. Aspects of the functional tool(s), e.g. knowledge engine, and its associated functionality may be embodied in a computer system/server in a single location, or in one embodiment, may be configured in a cloud based system sharing computing resources. With references to FIG. 8, a block diagram (800) is provided illustrating an example of a computer system/server (802), hereinafter referred to as a host (802) in communication with a cloud based support system, to implement the processes described above with respect to FIGS. 1-7. Host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (802) may be described in the general context of computer system-executable instructions, such as program modules, being executed by a computer system. Generally, program modules may include routines, programs, objects, components, logic, data structures, and so on that perform particular tasks or implement particular abstract data types. Host (802) may be practiced in distributed cloud computing environments where tasks are performed by remote processing devices that are linked through a communications network. In a distributed cloud computing environment, program modules may be located in both local and remote computer system storage media including memory storage devices.

Figure 8:
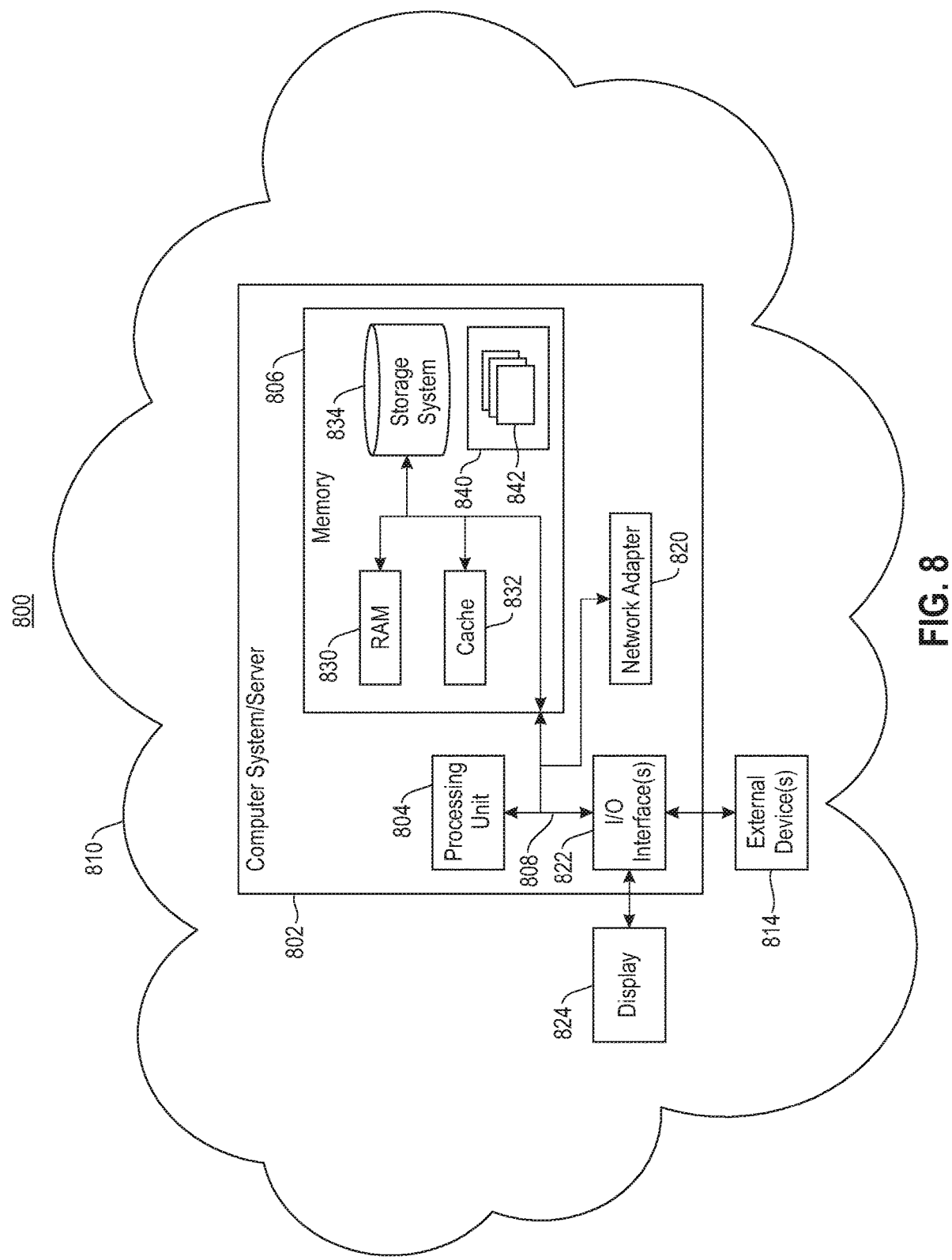
FIG. 8 is a block diagram illustrating an example of a computer system/server of a cloud based support system, to implement the process described above with respect to FIGS. 3-7.

As shown in FIG. 8, host (802) is shown in the form of a general-purpose computing device. The components of host (802) may include, but are not limited to, one or more processors or processing units (804), a system memory (806), and a bus (808) that couples various system components including system memory (806) to processor (804). Bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (802) typically includes a variety of computer system readable media. Such media may be any available media that is accessible by host (802) and it includes both volatile and non-volatile media, removable and non-removable media.

Memory (806) can include computer system readable media in the form of volatile memory, such as random access memory (RAM) (830) and/or cache memory (832). By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (840), having a set (at least one) of program modules (842), may be stored in memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (842) generally carry out the functions and/or methodologies of embodiments to data modeling directed at sensory input and output to experience a physical manifestation of an associated subject. For example, the set of program modules (842) may include the modules configured as the knowledge engine, information handling system, detection engine, and analyzer as described in FIG. 2.

Host (802) may also communicate with one or more external devices (814), such as a keyboard, a pointing device, a sensory input device, a sensory output device, apparatus (240) etc.; a visual display (824); one or more devices that enable a user to interact with host (802); and/or any devices (e.g., network card, modem, etc.) that enable host (802) to communicate with one or more other computing devices. Such communication can occur via Input/Output (I/O) interface(s) (822). Still yet, host (802) can communicate with one or more networks such as a local area network (LAN), a general wide area network (WAN), and/or a public network (e.g., the Internet) via network adapter (820). As depicted, network adapter (820) communicates with the other components of host (802) via bus (808). In one embodiment, a plurality of nodes of a distributed file system (not shown) is in communication with the host (802) via the I/O interface (822) or via the network adapter (820). It should be understood that although not shown, other hardware and/or software components could be used in conjunction with host (802). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (830), cache (832), and storage system (834), such as a removable storage drive and a hard disk installed in a hard disk drive.

Computer programs (also called computer control logic) are stored in memory (806). Computer programs may also be received via a communication interface, such as network adapter (820). Such computer programs, when run, enable the computer system to perform the features of the present embodiments as discussed herein. In particular, the computer programs, when run, enable the processing unit (804) to perform the features of the computer system. Accordingly, such computer programs represent controllers of the computer system.

In one embodiment, host (802) is a node (810) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
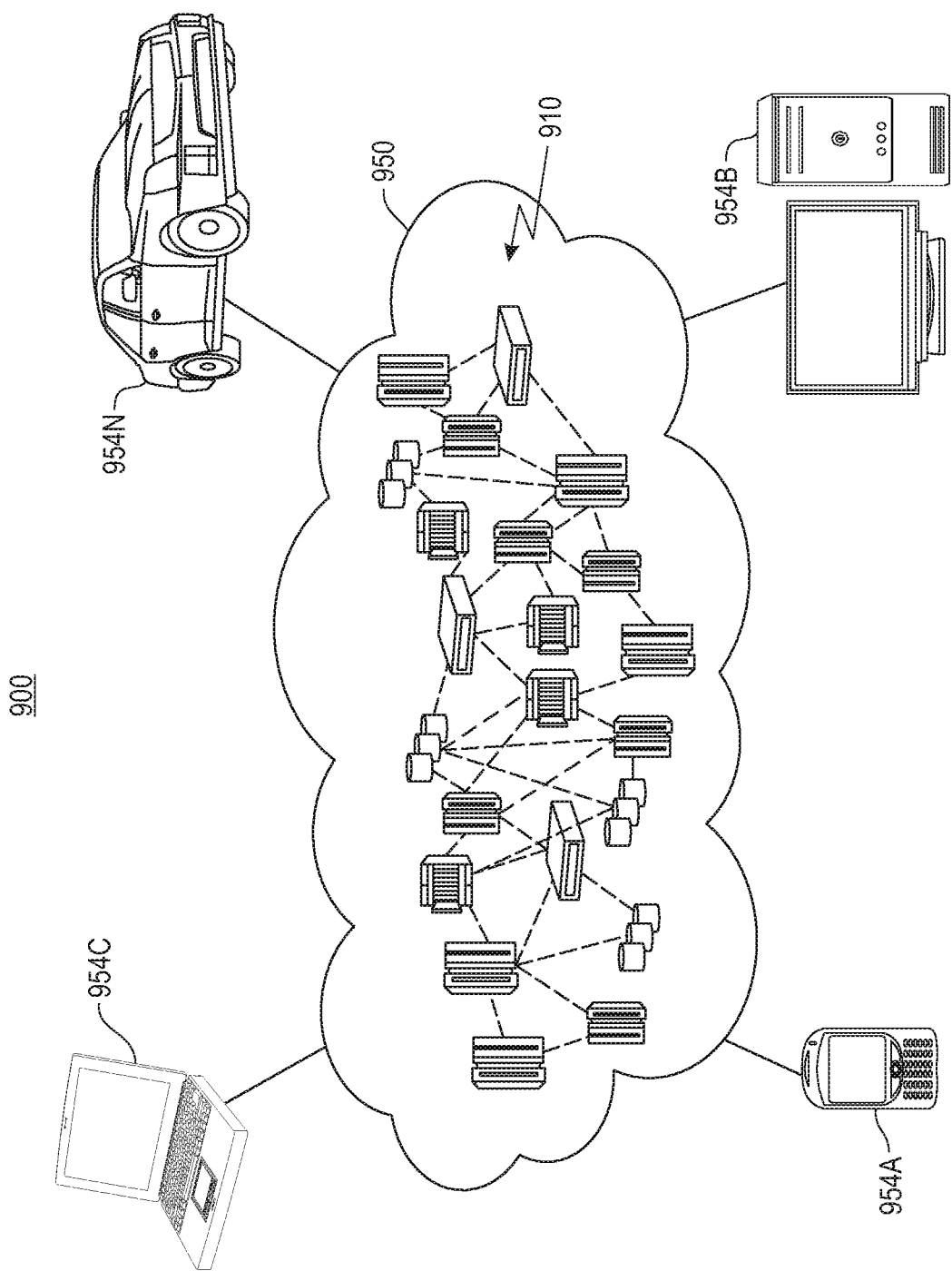
FIG. 9 depicts a block diagram illustrating a cloud computer environment.

Referring now to FIG. 9, an illustrative cloud computing network (900) is presented. As shown, cloud computing network (900) includes a cloud computing environment (950) having one or more cloud computing nodes (910) with which local computing devices used by cloud consumers may communicate. Examples of these local computing devices include, but are not limited to, personal digital assistant (PDA) or cellular telephone (954A), desktop computer (954B), laptop computer (954C), and/or automobile computer system (954N). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (954A-N) shown in FIG. 9 are intended to be illustrative only and that the cloud computing environment (950) can communicate with any type of computerized device over any type of network and/or network addressable connection (e.g., using a web browser).

Figure 10:
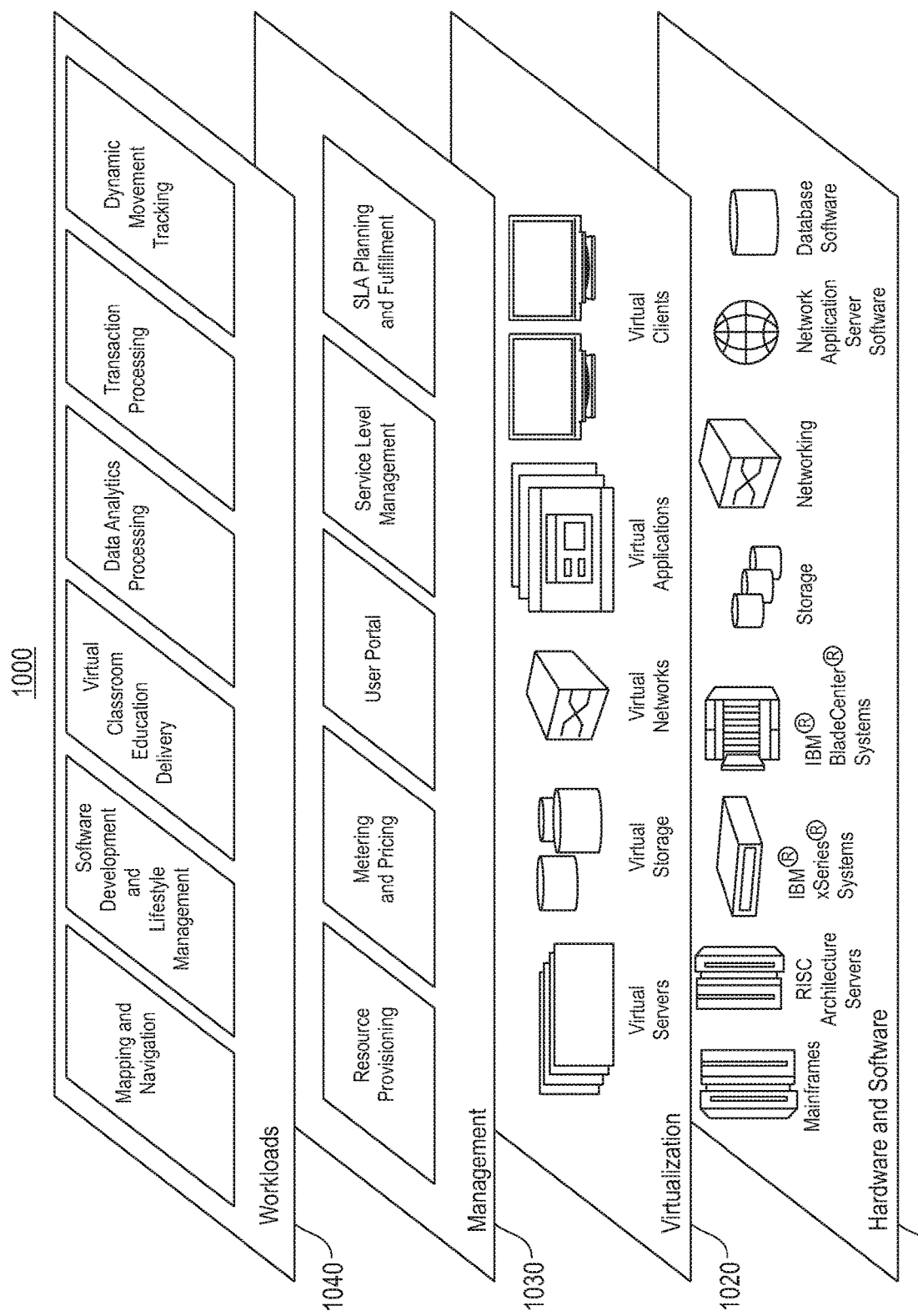
FIG. 10 depicts a block diagram illustrating a set of functional abstraction model layers provided by the cloud computing environment.

Referring now to FIG. 10, a set of functional abstraction layers (1000) provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040). The hardware and software layer (1010) includes hardware and software components. Examples of hardware components include mainframes, in one example IBM® zSeries®® systems; RISC (Reduced Instruction Set Computer) architecture based servers, in one example IBM pSeries® systems; IBM xSeries200 systems; IBM BladeCenter® systems; storage devices; networks and networking components. Examples of software components include network application server software, in one example IBM WebSphere® application server software; and database software, in one example IBM DB® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic movement tracking.

It will be appreciated that there is disclosed herein a system, method, apparatus, and computer program product for evaluating and processing sensory input, modeling the input, translating the input into a force, and ascertaining and communicating a sensory output. As disclosed, the system, method, apparatus, and computer program product apply artificial intelligence processing to the sensory input to contribute to identification of a corresponding sensory output.

While particular embodiments of the present embodiments have been shown and described, it will be obvious to those skilled in the art that, based upon the teachings herein, changes and modifications may be made without departing from these embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of a machine learning model.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the artificial intelligence platform and associated processing may be carried out by different computing platforms or across multiple devices. Furthermore, the data storage and/or corpus may be localized, remote, or spread across multiple systems. With respect to the sensor, one or more different classes of sensors may be applied as a substitute for the IMU or in conjunction with the IMU. Examples of the different classes of sensors include, but are not limited to an accelerometer and a gyroscope. Accordingly, the scope of protection of these embodiments is limited only by the following claims and their equivalents.

What is claimed is:
1. A system comprising:
   an apparatus comprising:
      a processing unit operatively coupled to memory;
      a sensor operatively coupled to the processing unit; and an inertial measurement unit (IMU) operatively coupled to the sensor; and
one or more hooks positioned on an external surface of the apparatus, the one or more hooks configured to receive a force to position the apparatus directly on an appendage in a hands-free motion; and an artificial intelligence platform in communication with the apparatus, the artificial intelligence platform having a detection engine to track progress of motion upon activation of the artificial intelligence platform, the detection engine to:
capture an initial position of the IMU;
recognize movement of the IMU from the initial position;
perform a comparison including compare the captured initial position to a second position correlated with the recognized movement;
determine a score based on the performed comparison;
create a diagnostic assessment based on the performed comparison and determined score;
convert the diagnostic assessment to feedback, the conversion utilizing real-time communication of an instruction of a second movement position of the IMU;
physically convey a manifestation of the feedback to the positioned apparatus; and
responsive to the feedback from the artificial intelligence platform, the one or more hooks are configured to selectively receive a reverse force to remove the apparatus from the appendage in a hands-free motion.

2. The system of claim 1, further comprising an analyzer operatively coupled to the artificial intelligence platform, the analyzer to interpret movement output data.

3. The system of claim 2, further comprising the analyzer to weigh and rank captured position data according to degree of congruence of the recognized movement with expected movement data.

4. The system of claim 3, further comprising the analyzer to generate an adjustment of position movement of the IMU, and the artificial intelligence platform to convert the generated adjustment to an instruction directed at the IMU.

5. The system of claim 3, further comprising the analyzer to track motion of the IMU across two or more positional movements.

6. The system of claim 3, further comprising two or more motion tracking algorithms operatively coupled to the IMU, and the artificial intelligence platform to select at least one of the algorithms based on the feedback.

7. The system of claim 1, further comprising a capacitive sensor operatively coupled to the processing unit, wherein activation of the capacitive sensor automatically activates the detection engine.

8. The system of claim 1, wherein the one or more hooks are configured to receive a force to change a position of the apparatus on the appendage in a hands-free motion.

9. The system of claim 1, wherein the apparatus further comprises a raised frictional element positioned on an interior surface of the apparatus, the raised frictional element to prevent slipping of the apparatus from the appendage.

10. The system of claim 1, further comprising the feedback from the diagnostic assessment configured to generate a signal to direct a physical position change of the apparatus, wherein the physical position change of the apparatus comprises the apparatus to move from a first position to a second position in a hands-free motion.

11. The system of claim 1, wherein the one or more hooks positioned on the exterior of the apparatus are positioned adjacent to a secondary surface and an application of force to the second surface repositions the apparatus on the appendage in the hands-free motion.

12. A computer program product to support sensory data in an artificial intelligence platform, comprising a computer readable storage medium having program code embodied therewith, the program code executable by a processing unit to:
track progress of motion through an operatively coupled apparatus, the apparatus comprising:
a sensor operatively coupled to an inertial measurement unit (IMU); and
one or more hooks positioned on an external surface of the apparatus, the one or more hooks configured to receive a force to position the apparatus directly on an appendage in a hands-free motion; and
capture an initial position of an inertial measurement unit (IMU) operatively coupled to the artificial intelligence platform;
recognize movement of the IMU from the initial position;
perform a comparison including compare the captured initial position to a second position correlated with the recognized movement;
determine a score based on the performed comparison;
create a diagnostic assessment based on the performed comparison and determined score;
convert the diagnostic assessment to feedback, the conversion utilizing real-time communication of an instruction of a second movement position of the IMU;
physically convey a manifestation of the feedback to the positioned apparatus; and
responsive to the feedback from the artificial intelligence platform, the one or more hooks are configured to selectively receive a reverse force to remove the apparatus from the appendage in a hands-free motion.

13. The computer program product of claim 12 further comprising program code to interpret movement output data, including weigh and rank captured position data according to degree of congruence of the recognized movement with expected movement data.

14. The computer program product of claim 13, further comprising program code to generate an adjustment of position movement of the IMU, and the artificial intelligence platform to convert the generated adjustment to an instruction directed at the IMU.

15. The computer program product of claim 13, further comprising program code to track motion of the IMU across two or more positional movements.

16. A method comprising:
providing an apparatus to track progress of motion, the apparatus comprising:
a sensor operatively coupled to an inertial measurement unit (IMU); and
one or more hooks positioned on an external surface of the apparatus, the
one or more hooks configured to receive a force to position the apparatus directly
on an appendage in a hands-free motion; and
activating the sensor operatively coupled to the IMU;
capturing an initial position of the IMU operatively coupled to an artificial intelligence platform responsive to the sensor activation, and recognizing movement of the IMU from the initial position;
performing a comparison including comparing the captured initial position to a second position correlated with the recognized movement;
determining a score based on the performed comparison;

creating a diagnostic assessment based on the performed comparison and determined score;
converting the diagnostic assessment to feedback, the conversion utilizing real-time communication of an instruction of a second movement position of the IMU; and
physically conveying a manifestation of the feedback to the apparatus; and
responsive to the feedback from the artificial intelligence platform, the one or more hooks are configured to selectively receive a reverse force to remove the apparatus from the appendage in a hands-free motion.

17. The method of claim 16, further comprising interpreting movement output data, including weighing and ranking captured position data according to degree of congruence of the recognized movement with expected movement data.

18. The method of claim 17, further comprising generating an adjustment of position movement of the IMU, and an artificial intelligence platform converting the generated adjustment to an instruction directed at the IMU.

19. The method of claim 17, further comprising tracking motion of the IMU across two or more positional movements.

20. The method of claim 16, a capacitive sensor operatively coupled to the IMU, wherein activating the capacitive sensor automatically activates capturing IMU position and movement data.

* * * * *